(12) United States Patent
Roodenburg et al.

(10) Patent No.: US 7,563,055 B2
(45) Date of Patent: Jul. 21, 2009

(54) MARINE PIPE LAYING SYSTEM, METHOD AND HOISTING DEVICE

(75) Inventors: Joop Roodenburg, Delfi (NL); Terence Willem August Vehmeijer, Den Haag (NL); Leopold Antonius Maria Crispinus van den Assum, Schiedam (NL)

(73) Assignee: ITREC B.V., Schiedam (NL)

( * ) Notice: Subject to any disclaimer, the term of this patent is extended or adjusted under 35 U.S.C. 154(b) by 211 days.

(21) Appl. No.: 11/430,338

(22) Filed: May 9, 2006

(65) Prior Publication Data
US 2006/0273291 A1   Dec. 7, 2006

(30) Foreign Application Priority Data
May 10, 2005   (EP)   ................... 05076088

(51) Int. Cl.
*F16L 1/12*   (2006.01)
(52) U.S. Cl. .............. 405/169; 405/170; 405/158; 254/399
(58) Field of Classification Search ............. 405/254.1, 405/169, 170, 17, 158; 254/399, 283, 284, 254/285, 334, 335, 336, 337, 338; 14/22.52, 14/22.53, 22.69, 22.71, 745.4
See application file for complete search history.

(56) References Cited

U.S. PATENT DOCUMENTS 3,863,898 A   2/1975   Brackin et al.
4,688,764 A * 8/1987   Nayler et al. ............... 254/277
5,421,675 A   6/1995   Brown et al.
6,361,250 B1 * 3/2002   de Varax ...................... 405/158
6,595,494 B1   7/2003   Roodenburg et al.

FOREIGN PATENT DOCUMENTS

DE   3736287   9/1988

* cited by examiner

*Primary Examiner*—David J Bagnell
*Assistant Examiner*—Sean D Andrish
(74) *Attorney, Agent, or Firm*—Buskop Law Group, PC; Wendy Buskop (57) ABSTRACT

Marine pipe laying systems and methods including a hoisting device for laying an offshore pipeline are disclosed. The hoisting device includes a tower with a tower top side provided with cable pulleys and a moveable traveling block displaceably attached to the tower. The traveling block includes first and second blocks with cable pulleys. A clamp attaches to the first block for holding pipe sections and lowering pipelines after the pipe section connects to the pipeline. The hoisting device includes a hoisting means including hoisting cable and a winch. The hoisting cable can be guided over the cable pulleys on the tower and the traveling block. The first and second blocks are adapted to be releasably coupled for traveling along the tower as a unit and for supporting greater pipeline weights. The second block can be locked to the tower to remain stationary while the first block travels along the tower.

13 Claims, 4 Drawing Sheets

MARINE PIPE LAYING SYSTEM, METHOD AND HOISTING DEVICE

CROSS REFERENCE TO RELATED APPLICATIONS

The present application claims priority to co-pending EP 05076088, entitled "Marine Pipe Laying System, Method and Hoisting Device" filed on May 10, 2005.

FIELD

The present embodiments generally relate to marine pipe laying systems and methods for laying of an offshore pipeline including a hoisting device and methods for connecting and moving pipeline.

BACKGROUND

Many of the existing offshore pipeline laying systems and methods include applications of hoisting systems for supporting the pipe load.

When laying a pipeline, the hoisting system is required to provide the necessary and adequate cable parts for supporting the load of the pipeline. However, many of the existing hoisting systems used in offshore systems include a traveling block that can only be moved upwards relatively slowly when the pipe load is released from the traveling block. This slow movement of the hoisting system can greatly limit the length of pipe that can be laid in one day by the pipe laying system and lead to greater costs in operations.

Thus, a need exists for an improved marine pipe laying system and method for providing quicker connecting of pipe sections for increased efficiency in laying of an offshore pipeline.

A need exists for a hoisting system and method that can support heavy loads and provide quicker and more efficient movements for raising, lowering, and connecting pipe sections for laying of an offshore pipeline.

The embodiments meet these needs.

BRIEF DESCRIPTION OF THE DRAWINGS

The detailed description will be better understood in conjunction with the accompanying drawings as follows.

The embodiments are detailed below with reference to the listed Figures.

DETAILED DESCRIPTION OF THE EMBODIMENTS

Before explaining the embodiments in detail, it is to be understood that the embodiments are not limited to the particular embodiments and that the embodiments can be practiced or carried out in various ways.

The present embodiments of the invention generally relate to marine pipe laying systems and methods for laying of an offshore pipeline, and include using a hoisting device and methods for connecting and moving sections of pipeline and other objects.

The embodiments generally relate to a marine pipe laying system for laying of an offshore pipeline, which includes a main supporting structure, a pipe connecting station, a static clamp, and a hoisting device with a locking means.

The pipe connecting station provides for connecting of sections of pipe and for connecting a pipe section to an uppermost end of a previously launched offshore pipeline. The static clamp is adapted to support the weight of the previously launched pipeline, and the static clamp can be adapted for releasably securing the uppermost end of the previously launched pipeline for connecting the sections of pipeline.

The embodiments of the marine system for laying of an offshore pipeline include the hoisting device, that includes a tower with a tower top side that is provided with cable pulleys, and a traveling block, which is displaceably attached to the tower and which is provided with cable pulleys and a traveling clamp for holding a pipe section to be connected to the offshore pipeline as well as for lowering the offshore pipeline after the pipe section is connected to the offshore pipeline. The hoisting device includes a hoisting means that includes a hoisting cable and a winch. The hoisting cable can be guided over the cable pulleys on both the tower top side and the traveling block. The traveling block is made moveable with respect to the tower by using the hoisting means.

The traveling block has to be able to support the offshore pipeline during launch of the pipeline, which in practice means that the traveling block has to be able to support a load of 1000 tons or more. To this end, the traveling block and the tower top side have to be provided with enough cable pulleys to guide the hoisting cable in order to create enough cable parts extending between the traveling block and the tower top side and the load being distributed over the parts. However, the more cable parts that are used and that extend between the traveling block and the tower top, the slower the traveling block is moved along the tower.

When laying a pipeline, the application of a hoisting system with enough cable parts is necessary to support the load of the pipeline, but the hoisting system can have the drawback that when the load is released from the traveling block, the traveling block can only be moved upwards relatively slowly, which limits the length of pipe to be laid in one day.

A benefit of the embodied marine pipe laying system for laying of an offshore pipeline is the ability to support the heavy loads and provide quicker and more efficient movements for raising, lowering, and connecting pipe sections for laying of an offshore pipeline.

This benefit is achieved by the pipe laying system including the traveling block, which includes a first block and a second block. Both the first block and the second block are provided with cable pulleys. The first block includes a traveling clamp attached to the first block for holding weight, and the first block and the second block are adapted to be releasably coupled together. In a coupled state, the first block and second block can travel along a tower as a single unit and are able to support the weight of the pipeline for hoisting, moving, and connecting the pipeline sections. The marine pipe laying system includes a locking means for locking the second block to the tower, which enables the first block to travel along the tower while the second block remains stationary with respect to the tower and creates a faster travel time for moving the first block and traveling clamp to the uppermost position on the tower for gripping sections of pipe.

Further, the embodiments of the systems and methods for laying an offshore pipeline enable valuable time to be saved in the pipe laying operations, which results in a significant decrease of costs for connecting and laying offshore pipelines.

In an embodiment of the system, the second block can be locked to a lower side of the tower for allowing the first block to move along the tower separately by using a locking means, that includes at least one locking pin which is movably located between a locked position in a locking hole and an unlocked position. In an embodiment, the at least one locking pin can be arranged on the second block of the traveling block, and the locking holes can be arranged on the tower. In another embodiment, the at least one locking pin can be arranged on the tower, and the locking holes can be arranged on the second block of the traveling block.

In an embodiment of the system, the hoisting means can be adapted to enable a travel time of the second block, traveling from a lowermost position to an uppermost position on the tower, to be identical to or less than the time for connecting the pipe section to the offshore pipeline.

The embodiments include a method for laying an offshore pipeline that can include using the marine pipe laying system for laying the offshore pipeline, in which the marine system includes a main supporting structure, a pipe connecting station for connecting a pipe section to an uppermost end of a previously launched offshore pipeline, a static clamp for supporting the weight of the previously launched offshore pipeline, and a hoisting device with a locking means. The hoisting device includes a tower with a top side provided with cable pulleys and a traveling block. The traveling block includes a first block with cable pulleys and a traveling clamp for holding pipe sections to be connected to the offshore pipeline, and a second block with cable pulleys is included in which the second block can be coupled to the first block for supporting the weight of the sections of pipeline. The hoisting device further includes a hoisting means that includes a hoisting cable and winch and a locking means for locking the second block to a side of the tower.

The steps of the method include supporting and holding an uppermost end of an offshore pipeline with the traveling clamp and the traveling block of the marine pipe laying system, in which the traveling block is positioned in an upper most position on a tower of the hoisting device.

Next, the method includes lowering the offshore pipeline to a lowermost position on the tower using the hoisting means. The hoisting means can lower the first block coupled to the second block of the traveling block for traveling along the tower as a single unit and supporting the weight of the offshore pipeline. Then, the steps of the method include gripping the uppermost end of the offshore pipeline with a static clamp, releasing the traveling clamp from the offshore pipeline, and locking the second block to the tower using the locking means.

After the second block is locked to the lower side of the tower, the method continues by hoisting the first block from the lowermost position on the tower to an uppermost position on the tower using the hoisting means, and gripping the uppermost end of a pipe section for connecting to the offshore pipeline using the traveling clamp.

Then, the method includes lowering the first block with the pipe section using the hoisting means. The lowering of the pipe section enables a lowermost end of the pipe section to be gripped and lined up with the uppermost end of the offshore pipeline at the pipe connecting station. A line-up tool can be used for lining up the pipe section with the offshore pipeline.

The next steps of the method include unlocking the second block from the tower, connecting the lowermost end of the pipe section to the uppermost end of the offshore pipeline, and hoisting the second block to the uppermost position on the tower while the pipe section is connected to the pipeline.

Then, the method includes coupling the first block and the second block, gripping the uppermost end of the pipe section with the traveling clamp, and releasing the offshore pipeline from the pipe connecting station and from the static clamp. In an embodiment, the traveling clamp can be released from the pipe section after the pipe section is gripped at the pipe connecting station.

In an embodiment, the second block can be moved from a lowermost position to an uppermost position on the tower and connected to the first block within a time span that is equal to or less than the time span for connecting the lowermost end of the pipe section to the uppermost end of the offshore pipeline.

In an embodiment, the first block attached to the traveling clamp can move up the tower separate from the second block moving upwards, when the launched pipeline is supported by the static clamp. The separate movements of the first block and the second block are enabled by using the locking means to lock the second block to the side of the tower to enable the first block to move separately. Since the second block remains locked and stationary with respect to the tower, the moving portion of the traveling block, which is the first block, can have less cable parts extending between the first block and the top side of the tower. The lesser number of cable parts can lead to a higher hoisting speed of the first block as compared to the case where the traveling block, including the first block and the second block, would be hoisted up as a single unit.

As a result of the first block moving more quickly up the tower, the attached traveling clamp can be available at the top side of the tower more quickly for gripping a new pipe section to be connected to the offshore pipeline hanging off the static clamp.

The first block positions the lowermost end of a pipe section at the pipe connecting station. After the lower most end of the pipe section is positioned, the pipe end can be gripped by a line-up means that can align or line up the pipe section with the uppermost end of the offshore pipeline. Next, the traveling clamp can be released from the first block. Then, the second block can be unlocked from the tower and hoisted up the tower by using the hoisting means.

In an embodiment, the hoisting of the second block can occur over a time span equal to and simultaneous with the connecting operation of the pipe section to the existing offshore pipeline, which positions the second block at an uppermost position on the tower for coupling to the first block, in a quicker time period. Then, the traveling block, with the first block coupled to the second block, can be a single unit that is ready for gripping the uppermost end of the pipeline and lowering the section of pipeline.

The embodiments of the system and method enable the first block with the traveling clamp to be available at the uppermost position on the tower within 17% of the time necessary for a non-splittable traveling block to be available at the uppermost position. Thus, the embodiments of the system and method for laying an offshore pipeline enable valuable time to be saved in the pipe laying methods, which can result in a significant decrease of costs for operations.

Another embodiment of the invention generally relates to a hoisting device for hoisting sections of pipeline and objects, in which the hoisting device can be usable in a marine pipe laying system. The hoisting device includes a tower, that has a tower top side that is provided with cable pulleys for use in raising and lowering sections of pipe.

The hoisting device includes a traveling block that can be displaceably attached to the tower. The traveling block includes a first block that is provided with cable pulleys and a holding means, such as a traveling clamp. The traveling clamp can be attached to the first block for holding and supporting a pipe section so that the pipe section can be connected to the offshore pipeline. The traveling clamp can be attached to the first block for lowering the offshore pipeline after the pipe section is connected to the offshore pipeline.

The traveling block includes a second block provided with cable pulleys. In an embodiment, the first block and the second block can be adapted to be releasably coupled together. In this embodiment, the first block coupled to the second block can travel along the tower as a single unit and can support a higher or greater load or weight, such a larger section of pipe for connecting to an offshore pipeline, than supported separately by a first block or a second block in an uncoupled state.

The hoisting device includes a hoisting means that includes a hoisting cable and a winch. In an embodiment, the hoisting cable can be guided over the cable pulleys on both the tower top side and the traveling block. The traveling block can be moveable with respect to the tower by using the hoisting means for movement of the traveling block.

The hoisting device can include a locking means that can attach to the second block of the traveling block. In an embodiment, the locking means can lock the second block to a side of the tower, such as a lower side of the tower. In this embodiment, the second block remains stationary with respect to the tower while the first block can travel more quickly in an upward direction along the tower. An example of the locking means can be a locking pin and locking hole for inserting the locking pin.

The embodiments of the invention include using the hoisting device in a method for hoisting a load for performing an operation cycle for laying an offshore pipeline. The method steps include gripping a first load using a traveling clamp and a traveling block of the hoisting device, in which a first block is coupled to a second block of the traveling block and positioned as a single unit in an uppermost position on a tower of the hoisting device.

The hoisting device usable herein includes a tower, that has a tower top side that is provided with cable pulleys for use in raising and lowering sections of pipe, and a traveling block that can be displaceably attached to the tower. The traveling block includes a first block that is provided with cable pulleys and a traveling clamp can be attached to the first block for holding and supporting a pipe section so that the pipe section can be connected to the offshore pipeline. The traveling block includes a second block provided with cable pulleys that can be coupled to the first block in an embodiment. The hoisting device includes a hoisting means that includes a hoisting cable and a winch. In an embodiment, the hoisting cable can be guided over the cable pulleys on both the tower top side and the traveling block. The traveling block can be moveable with respect to the tower by using the hoisting means for movement of the traveling block. Further, the hoisting device can include a locking means that can attach to the second block of the traveling block for connecting the second block to the tower.

The next steps of the method include lowering the first load, which is secured to the coupled first block and the coupled second block, to a lowermost position on the tower by using the hoisting means. Then, the first load can be released from the traveling clamp for handing the first load over to a load handling device.

The method continues by locking the second block to the lower side of the tower using the locking means, and hoisting the first block from the lowermost position on the tower to the uppermost position on the tower using the hoisting means. The first block in the uppermost position on the tower can be used for an intermediate operation. In an intermediate operation step of the operation cycle, the first block can be available at the top side of the tower for taking part in the intermediate operation and a full load supporting capacity is not required.

Then, the method continues by unlocking the second block from the tower, and hoisting the second block to the uppermost position on the tower for coupling the second block to the first block.

In an embodiment of the method, the first block can be used to deliver an intermediate load to a load handling device. In this embodiment, when the first block is released from the intermediate load for handling the intermediate load by the load handling device, the second block can return to the uppermost position on the tower. The cycle of time can be significantly reduced when the time period necessary to handle the intermediate load does not exceed the time necessary to hoist up the second block.

The embodiments of the invention include a method for connecting a first object and a second object at a connecting station by using the hoisting device. The steps of the method include holding the first object using a traveling clamp and a traveling block positioned in an uppermost position on a tower of the hoisting device, in which the hoisting device includes: a tower, a traveling block with a first block and a second block, a hoisting means that includes a hoisting cable and a winch, and a locking means.

The next steps of the method include lowering the first object, that is secured to the first block coupled to the second block, to a lowermost position on the tower using the hoisting means. Next, the method includes gripping the first object using a gripping means located at the connecting station. In an embodiment, the connecting station can be a welding station.

Then, the method includes locking the second block to the lower side of the tower using the locking means, and hoisting the first block from the lowermost position on the tower to an uppermost position on the tower by using the hoisting means.

The steps of the method continue by gripping the second object using the traveling clamp, and lowering the first block with the second object using the hoisting means. The second object can be delivered to the connecting station, wherein the second object can be gripped by the gripping means located at the connecting station. In an embodiment, the traveling clamp can be released from the second object after the second object has been gripped by the gripping means of the connecting station.

The method continues by releasing the traveling clamp from the second object, and unlocking the second block from the tower. Then, the second object can be connected to the first object while or at the same time that the second block is hoisted upward to the uppermost position on the tower.

After the second block reaches the top of the tower, the method includes the step of coupling the first block to the second block, and gripping the connected first object and second object using the traveling clamp. Then, the method includes releasing the first object connected to the second object from the connecting station, and holding and supporting the first object connected to the second object by using the traveling clamp and the traveling block positioned in an uppermost position on the tower.

Figure 1:
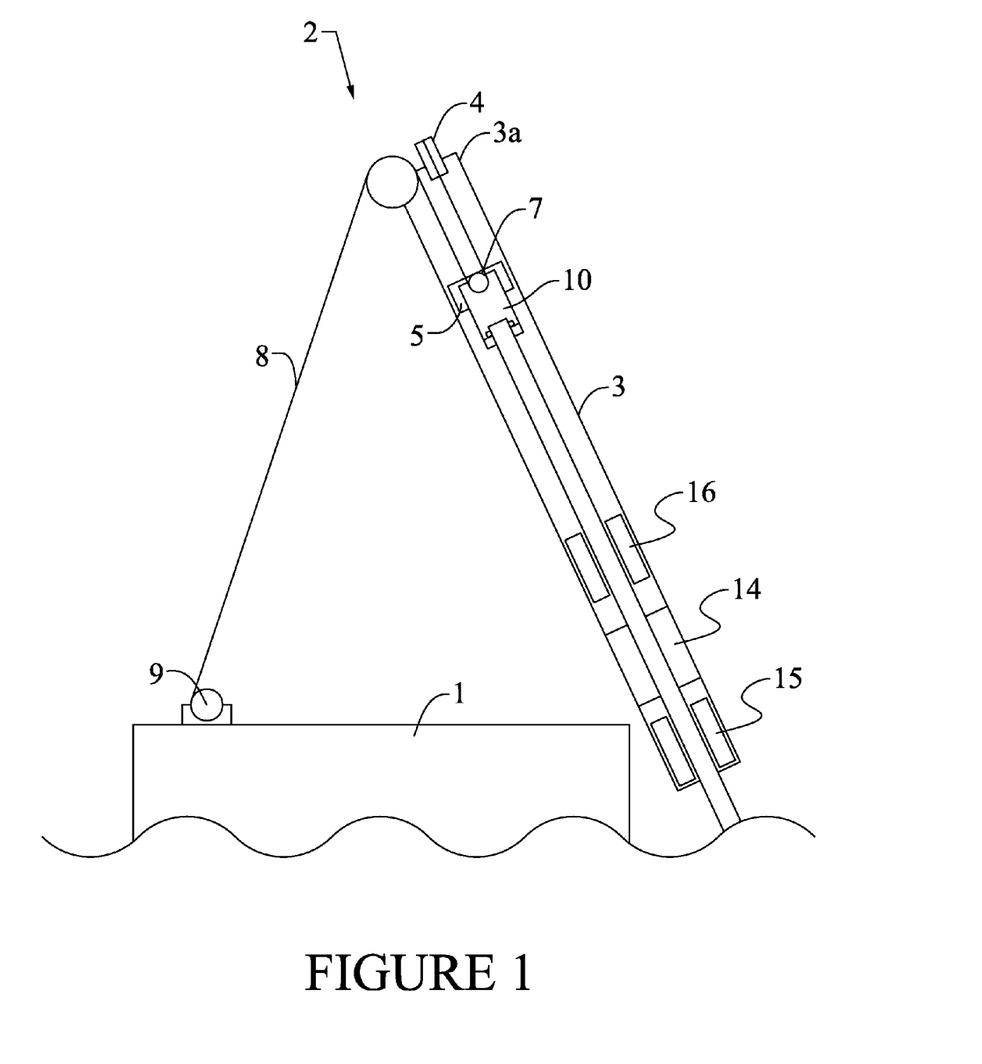
FIG. 1 depicts a schematic side elevational view of an embodiment of a marine pipe laying system.

With regard to the Figures, FIG. 1 depicts a schematic side elevational view of an embodiment of a marine pipe laying system, and FIGS. 2-7 show a schematic front view of a pipe laying system illustrating the steps of an embodiment of a pipe laying method.

The embodied system relates to a vertical or near vertical pipeline laying technique, such as the J-lay technique, for a pipeline launched from a vessel in an essentially vertical orientation. The system provides an improved pipe laying system for vertical or near vertical marine pipelaying, particularly in deep water.

The methods illustrated with reference to the FIGS. 1-7 relate to an efficient system and method for the vertical or near vertical laying of offshore pipelines.

Figure 2:
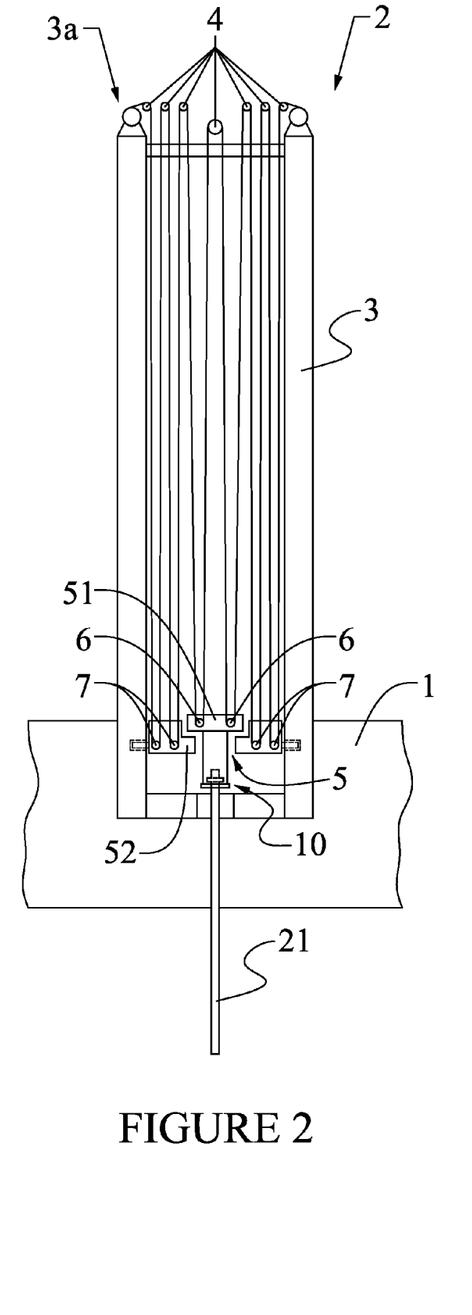
FIG. 2 depicts a schematic front view of a marine pipe laying system illustrating a first in a sequential series of steps in an embodiment of a method for laying an offshore pipeline.

The pipe laying system provides a vessel which acts as a main supporting structure. In FIG. 1 and FIG. 2, a part of this vessel is shown and indicated by reference numeral (1). In the FIGS. 3-7, the vessel (1) is omitted for the reasons of clarity of the drawing.

In FIG. 1, the marine pipe laying system includes a hoisting device (2) provided on the vessel (1). The hoisting device (2) includes a tower (3) with a tower top side (3a). Cable pulleys (4) are located on the tower top side (3a) of FIG. 1.

The hoisting device (2) further includes a traveling block (5) which is displaceably attached to the tower (3), and a traveling clamp (10) for holding weight. The traveling block (5) can be provided with cable pulleys (6) and (7). Cable pulleys (7) can be seen in FIG. 1, while cable pulleys (6) are better seen in FIGS. 2-7.

In FIG. 1, the hoisting device (2) includes a hoisting means, that includes a hoisting cable (8) and a winch (9). The hoisting cable (8) can be guided over the cable pulleys (4) located at the top side (3a) of the tower (3), and the cable pulleys (6) and (7) on the traveling block (5). By winding up and unwinding the cable (8) on and off the winch (9), the traveling block (5) can be moveable with respect to the tower (3).

The pipe laying system can include a pipe connecting station (14), which can be a pipe welding station. The pipe laying system can include a line-up tool (16) for lining up the lowermost end of a pipe section with the uppermost end of the pipeline such that the two ends can be welded together in the welding station (14). The pipe laying system can include a static clamp (15), for gripping the uppermost end of the pipeline.

FIG. 2 depicts a schematic front view of a marine pipe laying system illustrating a first in a sequential series of steps in an embodiment of a method for laying an offshore pipeline.

As shown in FIG. 2, the traveling block (5) includes a first block (51) and a second block (52). In the embodiment of the method shown in FIGS. 2-7, the first block (51) is provided with two cable pulleys (6). The second block (52) is provided with four cable pulleys (7).

Figure 4:
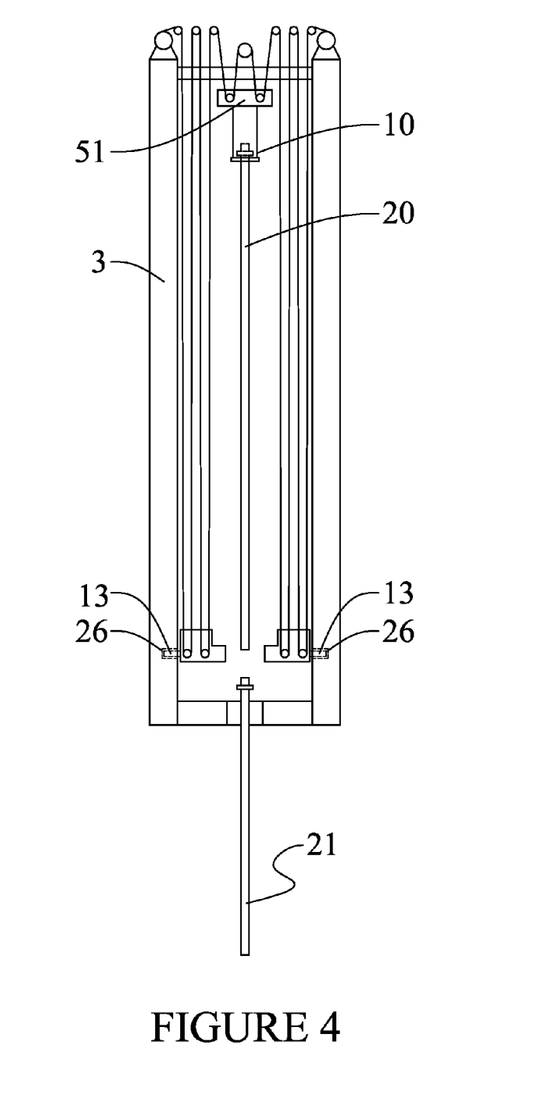
FIG. 4 depicts a third in the sequential series of steps in the embodiment of the method started with FIG. 2.

The first block (51) includes the traveling clamp (10) attached to the first block (51) as shown in FIG. 2. The traveling clamp (10) can be adapted to grip the upper end of a single pipe section (20 as shown in FIG. 4) or a pipeline (21 as shown in FIG. 2) which will be described in more detail below.

Figure 3:
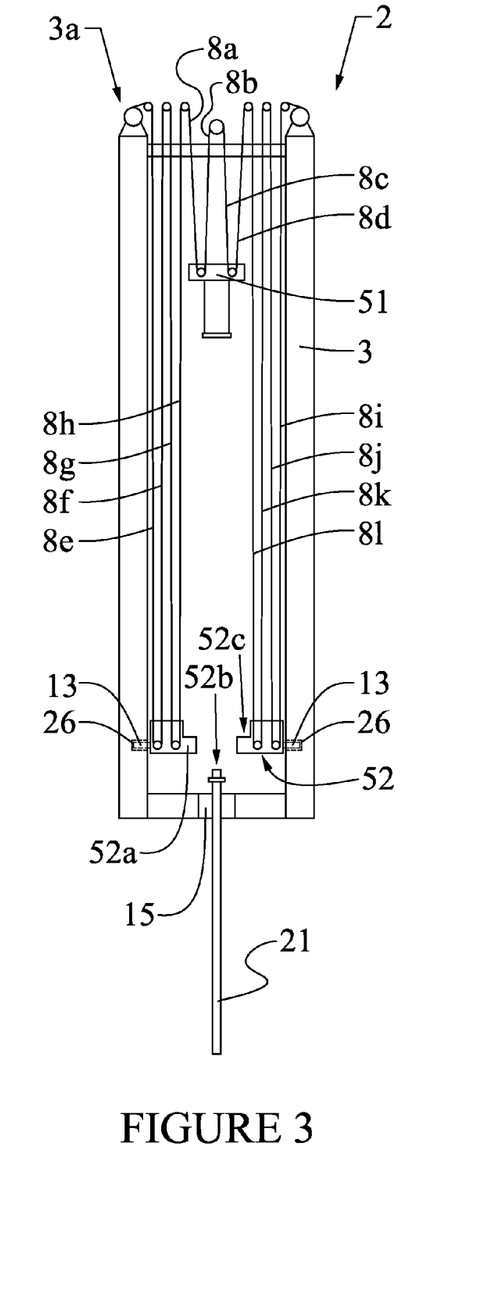
FIG. 3 depicts a second in the sequential series of steps in the embodiment of the method started with FIG. 2.

As shown in FIG. 3, the second block (52) has a substantial ring shaped body (52a) with a central opening (52b). The first block (51) has a body with a diametrical dimension exceeding the diametrical dimension of the central opening (52b) of the second block (52), such that the first block (51) cannot pass through the central opening (52b) of the second block (52). The second block (52) has a supporting surface (52c) facing upwards and surrounding the central opening (52b) for engagement with the first block (51) and for supporting the first block.

Returning to FIG. 2, the first block (51) and the second block (52) can be coupled together. In the coupled state, which is shown in FIG. 2, the first block (51) engages the supporting surface of the second block (52). In the coupled state, the first block (51) and the second block (52) can form a single unit and are capable of supporting the weight of a load held by the traveling clamp (10). This load can be the load of a pipeline hanging off which can have an amount up to 1000 tons. The single unit, or the traveling block unit, formed by the coupled first block (51) and second block (52) can travel along the tower (3) by operation of the hoisting means of the hoisting device (2).

The structure of the traveling block (5) can include the first block (51) separated from the second block (52). In an embodiment, the second block (52) can be locked to a lower part of the tower (3) by a suitable locking means, preferably locking pins (13 as shown in FIG. 3). The locking pins (13) can be arranged on the second block (52) such that the locking pins can move towards an extended position and extend into locking holes (26) provided in the tower (3), upon a suitable control signal.

In another embodiment, the tower (3) can be provided with the locking pins (13), which upon a suitable control signal can move towards an extended position and extend into locking holes (26) provided in the second block (52).

Locking of components using locking pins and locking holes is a generally known locking mechanism. The locking means usable herein includes the preferred locking pins and locking holes and any other suitable locking mechanisms, such as the locking pins and locking holes that are included herein, a bolt/nut combination, a cylinder, a clamp, and other locking mechanism combinations.

In an embodiment, the second block (52) can be locked to the tower (3), and the first block (51) can travel along the tower (3) to an uppermost position at the top side of the tower (3a), while the second block (52) remains stationary with respect to the tower (3). FIG. 2 shows the cable pulleys (4) located at the top side (3a) of the tower (3).

The pipe laying system can include a line-up tool (16 as shown in FIG. 1) for lining up the lowermost end of a pipe section (20 as shown in FIG. 4) with the uppermost end of the pipeline (21), such that the two ends can be welded together in a pipe connecting station (14 as shown in FIG. 1). The static clamp (15 as shown in FIG. 3), can be a hang off clamp for gripping an upper end of the pipeline (21). The static clamp can be adapted to support the load of the pipeline (21). These components can become more apparent in the following description of a pipe laying method.

In FIG. 2, the method includes a first block (51) and second block (52) coupled together, and the traveling clamp (10) is holding the uppermost end of the pipeline (21) and supporting the load of the launched pipeline (21). Next, the static clamp (15 as shown in FIG. 1) will grip the upper end of the pipeline (21) and take over the load of the pipeline (21). Then, the traveling clamp (10) can be released from the pipeline (21). Next, the second block (52) can be coupled to the tower (3) by means of the locking pins (13 as shown in FIG. 3).

FIG. 3 depicts a second in the sequential steps of the embodiment of the method started with FIG. 2. As is illustrated in FIG. 3, this locked state of the second block (52) allows the first block (51) to be hoisted up by operating the winch of the hoisting device (2) while the second block (52) is retained by the locking pins (13) at its lowermost position on the tower (3). In this embodiment of the method, the first block (51) has two cable pulleys (6) and the second block (52) has four cable pulleys (7) as shown in FIG. 2.

FIG. 3 shows four cable parts (8*a*, 8*b*, 8*c*, and 8*d*) extend between the top side (3*a*) of the tower (3) and the first block (51), and eight cable parts (8*e*, 8*f*, 8*g*, 8*h*, 8*i*, 8*j*, 8*k*, and 8*l*) extend between the top side (3*a*) of the tower (3) and the second block (52). This embodiment implies that the first block (51) can be hoisted up in one third of the time that would be necessary if a non-splittable traveling block with twelve cable parts would be applied. This quicker hoisting time means that the traveling clamp with the first block (51) can be available at the top side (3*a*) of the tower (3) much quicker for gripping a light load, such as a single pipe section (20 as shown in FIG. 4). The intermediate time necessary to connect the single pipe section to the pipeline (21) is efficiently used to move the second block (52) upwards to bring the hoisting system to its full supporting capacity, which is necessary to lower the pipeline (21).

FIG. 4 depicts a third in the sequential steps of the embodiment of the method started with FIG. 2. At the moment in time that the first block (51) has arrived at the uppermost position at the tower (3), a new pipe section (20) is delivered to the tower (3) by means of suitable pipe delivering means. This new pipe section (20) can be gripped at its upper end by the traveling clamp (10) as is shown in FIG. 4, for connecting to the pipeline (21).

Figure 5:
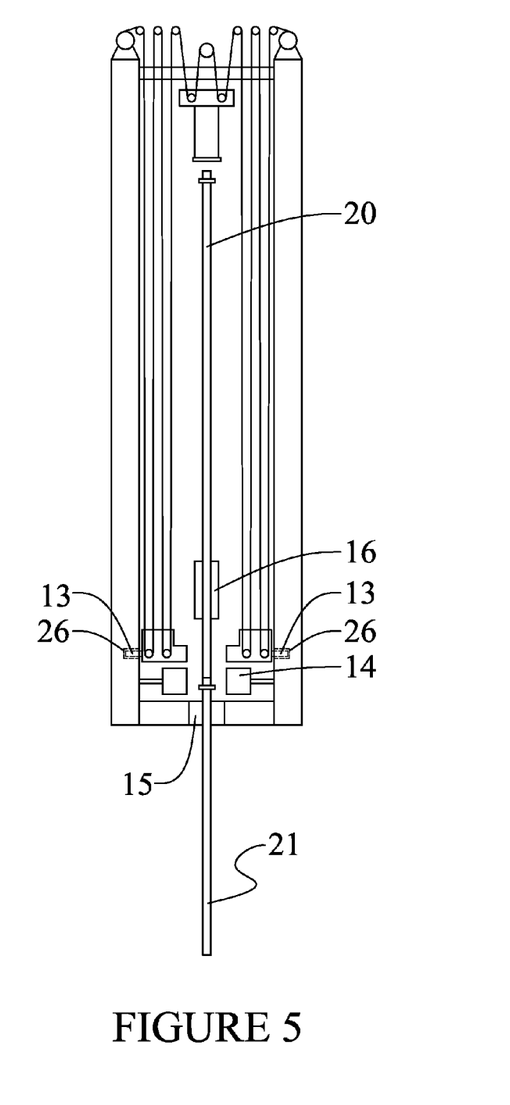
FIG. 5 depicts a fourth in the sequential series of steps in the embodiment of the method started with FIG. 2.

FIG. 5 depicts a fourth in the sequential steps of the embodiment of the method started with FIG. 2. The pipe section (20) can be lowered over such a distance that the pipe section can be gripped by the line-up tool (16), after which the traveling clamp can be released from the pipe section (20). Next the pipe section (20) can be lined up with the pipeline (21) hanging off the static clamp (15) before their respective ends are connected by welding the ends together in the welding station (14).

Figures 6, 7:
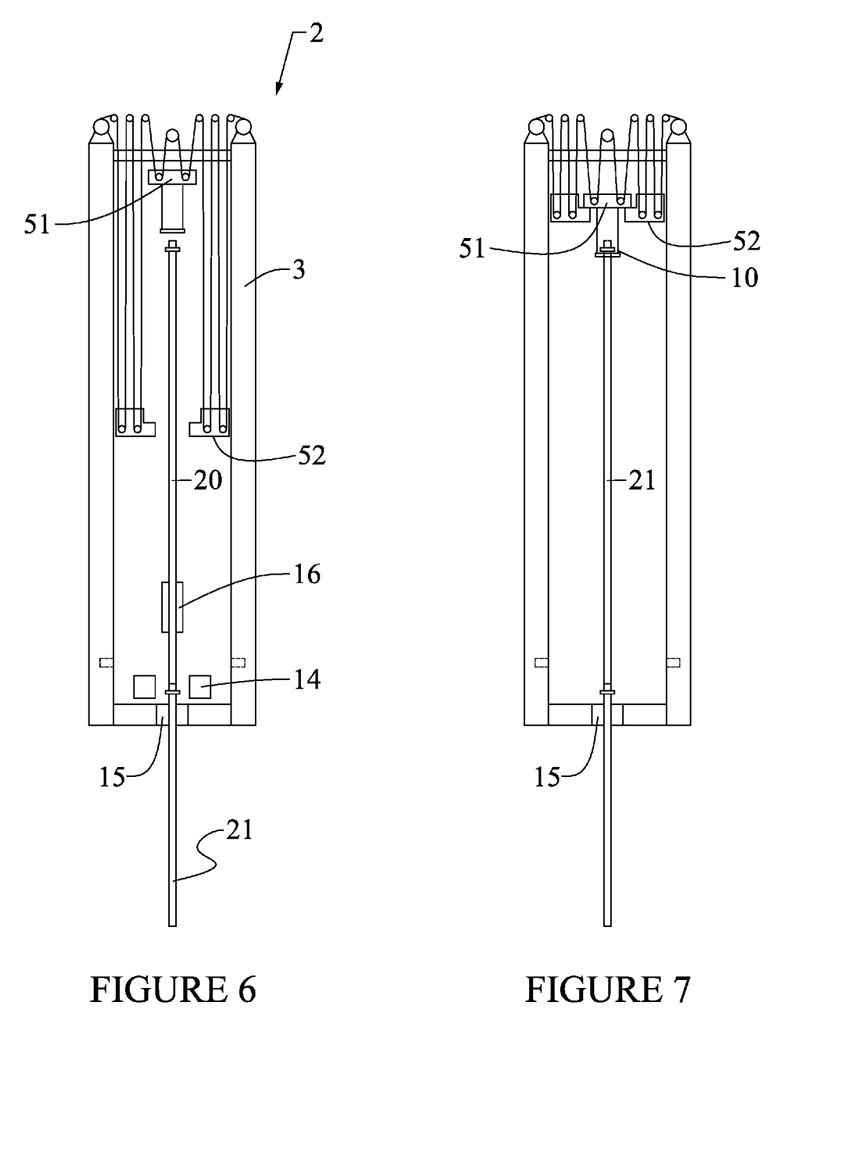
FIG. 6 depicts a fifth in the sequential series of steps in the embodiment of the method started with FIG. 2.
FIG. 7 depicts a sixth in the sequential series of steps in the embodiment of the method started with FIG. 2.

FIG. 6 depicts a fifth in the sequential steps of the embodiment of the method started with FIG. 2. As is shown in FIG. 6, during the welding operation the locking pins are released and the second block (52) is hoisted towards its uppermost position on the tower (3) by operation of the winch of the hoisting device (2). Preferably the system is designed such that hoisting the second block (52) to its uppermost position takes less than the time necessary to weld the pipe section (20) and the pipeline (21) together. In such an intermediate step of the operation cycle, the hoisting system is not needed to carry a full load, and the hoisting system can be used efficiently to join the first block (51) and second block (52). FIG. 6 shows that the line-up tool (16) remains attached for lining up the pipe section (20) to the pipeline (21) during completion of the welding at the connecting station (14), and the pipeline is held by the static clamp (15).

FIG. 7 depicts a sixth in the sequential steps of the embodiment of the method started with FIG. 2. FIG. 7 shows the state in which the second block (52) has arrived at its uppermost position on the tower (3) and is joined together with the first block (51). In this state, the traveling clamp (10) grips the upper end of the pipeline (21). Because the single unit of the traveling block formed by the first block (51) and second block (52) is able to support the load of the pipeline (21), the static clamp (15) is released from the pipeline (21) and the pipeline (21) is lowered by operating the winch of the hoisting device until the state depicted in FIG. 2 is reached. The steps of this cycle depicted in FIG. 2-FIG. 7 can be repeated for the laying of the pipeline (21).

In the embodiments of the method for laying an offshore pipeline shown in FIGS. 2-7, the first block (51) cannot pass through the central opening in the second block (52). A traveling block structure is however envisaged, wherein the first block and second block can be coupled in another manner, such as by using locking pins or the like, wherein the first block can pass the second block from above or below.

The embodiments of the marine pipe laying system enable a considerable amount of time to be gained. The saving or gaining of valuable time in the operations for laying an offshore pipeline leads to a considerable reduction of the overall time of use of pipe laying equipment and thus in pipe laying costs.

It is to be understood that the invention is not limited to the particular embodiments illustrated in the figures. The invention can be performed and practiced in various ways. The embodiments can be applied with other pipe laying methods that can include a more inclined launch direction than the one illustrated in the above, and almost horizontal like, S-lay. The application of the hoisting system is not limited to a pipe laying method, but could also be applied for other operations, such as offshore drilling.

While these embodiments have been described with emphasis on the embodiments, it can be understood that within the scope of the appended claims, the embodiments might be practiced other than as specifically described herein.

What is claimed is:

1. A marine pipe laying system for laying of an offshore pipeline, wherein the system comprises:
   a. a main supporting structure;
   b. a pipe connecting station, wherein a pipe section is connected to an uppermost end of a previously launched offshore pipeline;
   c. a static clamp adapted for releasably securing the uppermost end of the previously launched offshore pipeline, wherein the static clamp is adapted to support a weight of the previously launched offshore pipeline;
   d. a hoisting device comprising:
      i. a tower with a tower top side provided with cable pulleys;
      ii. a traveling block displaceably attached to the tower, wherein the traveling block comprises:
         1. a first block with cable pulleys and a traveling clamp attached to the first block, wherein the traveling clamp holds the pipe section to be connected to the offshore pipeline and lowers the offshore pipeline after the pipe section is connected to the offshore pipeline; and
         2. a second block with cable pulleys, wherein the second block is adapted to be releasably coupled with the first block, wherein the first block coupled to the second block travels along the tower as a single unit and supports the weight of the offshore pipeline; and
      iii. a hoisting means comprising a hoisting cable and a winch, wherein the hoisting cable is guided over the cable pulleys on both the tower top side and the traveling block, wherein the traveling block is moveable with respect to the tower; and
   e. a locking means adapted for locking the second block to the tower wherein the locking means is adapted to lock the second block in a lowermost position at a lower side of the tower, wherein the second block remains stationary with respect to the tower and the first block travels in an upward direction towards an uppermost position along the tower.

2. The system of claim 1, wherein the hoisting means are adapted to enable a travel time of the second block traveling from the lowermost position to the uppermost position on the tower to be identical to or less than the time to connect the pipe section to the offshore pipeline.

3. The system of claim 1, wherein the locking means comprises at least one locking pin, wherein each of said at least one locking pin is movably located between a locked position in a locking hole and an unlocked position.

4. The system of claim 3, wherein the at least one locking pin is arranged on the second block of the traveling block and the locking hole is arranged on the tower.

5. The system of claim 3, wherein the at least one locking pin is arranged on the tower and the locking hole is arranged on the second block of the traveling block.

6. The system of claim 1, wherein the pipe connecting station comprises a welding station.

7. A method for laying an offshore pipeline, wherein the method comprises:
  a. supporting an uppermost end of the offshore pipeline using a traveling clamp and a traveling block positioned in an upper most position on a tower of a marine pipe laying system, wherein the marine pipe laying system comprises;
    i. a main supporting structure;
    ii. a pipe connecting station, wherein a pipe section is connected to an uppermost end of a previously launched offshore pipeline;
    iii. a static clamp adapted for releasably securing the uppermost end of the previously launched offshore pipeline, wherein the static clamp is adapted to support a weight of the previously launched offshore pipeline;
    iv. a hoisting device comprising:
      1. a tower with a tower top side provided with cable pulleys;
      2. a traveling block displaceably attached to the tower, wherein the traveling block comprises:
        a. a first block with cable pulleys and a traveling clamp attached to the first block, wherein the traveling clamp holds the pipe section to be connected to the offshore pipeline and lowers the offshore pipeline after the pipe section is connected to the offshore pipeline; and
        b. a second block with cable pulleys, wherein the second block is adapted to be releasably coupled with the first block, wherein the first block coupled to the second block travels along the tower as a single unit and supports the weight of the offshore pipeline; and
      3. a hoisting means comprising a hoisting cable and a winch, wherein the hoisting cable is guided over the cable pulleys on both the tower top side and the traveling block, wherein the traveling block is moveable with respect to the tower; and
    v. a locking means for locking the second block to the tower; and
  b. lowering the offshore pipeline to a lowermost position on the tower using the hoisting means, wherein the hoisting means lowers the first block coupled to the second block for traveling along the tower as the single unit, wherein the first block coupled to the second block supports the weight of the offshore pipeline;
  c. gripping the uppermost end of the offshore pipeline with the static clamp for releasing the traveling clamp from the offshore pipeline;
  d. locking the second block to the tower using the locking means;
  e. hoisting the first block from the lowermost position on the tower to the uppermost position on the tower using the hoisting means;
  f. gripping an uppermost end of the pipe section for connecting to the offshore pipeline using the traveling clamp;
  g. lowering the first block with the pipe section using the hoisting means, wherein the lowering of the pipe section enables a lowermost end of the pipe section to be gripped and lined up with the uppermost end of the offshore pipeline at the pipe connecting station;
  h. unlocking the second block from the tower;
  i. connecting the lowermost end of the pipe section to the uppermost end of the offshore pipeline,
  j. hoisting the second block to the uppermost position on the tower while the pipe section is connecting to the offshore pipeline;
  k. coupling the first block and the second block;
  l. gripping the uppermost end of the pipe section using the traveling clamp; and
  m. releasing the offshore pipeline from the pipe connecting station and from the static clamp, wherein the uppermost end of the offshore pipeline is supported by the traveling clamp and the traveling block in the uppermost position on the tower.

8. The method of claim 7, wherein the second block is moved from the lowermost position to the uppermost position on the tower and connected to the first block within a time span that is equal to or less than the time span for connecting the lowermost end of the pipe section to the uppermost end of the offshore pipeline.

9. The method of claim 7, wherein the traveling clamp is released from the pipe section after the pipe section is gripped at the pipe connecting station.

10. A hoisting device for hoisting a load for laying an offshore pipeline, wherein the hoisting device comprises:
  a. a tower with a tower top side provided with cable pulleys;
  b. a traveling block displaceably attached to the tower, wherein the traveling block comprises:
    i. a first block with cable pulleys and a traveling clamp attached to the first block, wherein the traveling clamp holds a pipe section to be connected to the offshore pipeline and lowers the offshore pipeline after the pipe section is connected to the offshore pipeline; and
    ii. a second block with cable pulleys, wherein the first block and the second block are adapted to be releasably coupled, wherein the first block coupled to the second block travels along the tower as a single unit and supports a higher load weight of the offshore pipeline than supported by the first block or the second block in an uncoupled state; and
  c. a hoisting means comprising a hoisting cable and a winch, wherein the hoisting cable is guided over the cable pulleys on both the tower top side and the traveling block, wherein the traveling block is moveable with respect to the tower by using the hoisting means; and
  d. a locking means attached to the second block for locking the second block to a lower side of the tower, wherein the second block locked to the tower remains stationary with respect to the tower and the first block travels in an upward direction along the tower.

11. A method for hoisting a load using a hoisting device for performing an operation cycle for laying an offshore pipeline, wherein the method comprises:
  a. gripping the load using a traveling clamp and a traveling block, wherein the traveling block comprises a first block coupled to a second block positioned as a single unit in an uppermost position on a tower of the hoisting device, wherein the hoisting device comprises:

i. the tower with a tower top side provided with cable pulleys;
ii. the traveling block displaceably attached to the tower, wherein the traveling block comprises:
   1. the first block with cable pulleys and the traveling clamp attached to the first block, wherein the traveling clamp holds a pipe section to be connected to the offshore pipeline and lowers the offshore pipeline after the pipe section is connected to the offshore pipeline; and
   2. the second block with cable pulleys, wherein the first block and the second block are adapted to be releasably coupled, wherein the first block coupled to the second block travels along the tower as a single unit and supports a higher load weight of the offshore pipeline than supported by the first block or the second block in an uncoupled state; and
ii. a hoisting means comprising a hoisting cable and a winch, wherein the hoisting cable is guided over the cable pulleys on both the tower top side and the traveling block, wherein the traveling block is moveable with respect to the tower by using the hoisting means; and
iii. a locking means attached to the second block for locking the second block to a lower side of the tower, wherein the second block locked to the tower remains stationary with respect to the tower and the first block travels in an upward direction along the tower; and
b. lowering the load secured to the first block coupled to the second block to a lowermost position on the tower by using the hoisting means, wherein the load is released from the traveling clamp for handling the load over to a load handling device;
c. locking the second block to the lower side of the tower using the locking means;
d. hoisting the first block from the lowermost position on the tower to the uppermost position on the tower using the hoisting means, wherein the first block in the uppermost position on the tower is used for an intermediate operation;
e. unlocking the second block from the tower; and
f. hoisting the second block to the uppermost position on the tower for coupling the second block to the first block.

12. A method of claim 11, further comprising using the hoisting device for connecting a first object to a second object at a connecting station, wherein the method comprises:
   a. holding the first object using the traveling clamp and the traveling block positioned in the uppermost position on the tower of the hoisting device;
   b. lowering the first object secured to the first block coupled to the second block to the lowermost position on the tower using the hoisting means;
   c. gripping the first object using a gripping means located at the connecting station;
   d. locking the second block to the tower using the locking means;
   e. hoisting the first block from the lowermost position on the tower to the uppermost position on the tower using the hoisting means;
   f. gripping the second object using the traveling clamp;
   g. lowering the first block with the second object using the hoisting means, wherein the second object is delivered to the connecting station, wherein the second object is gripped by the gripping means;
   h. releasing the traveling clamp from the second object;
   i. unlocking the second block from the tower;
   j. connecting the second object to the first object;
   k. hoisting the second block to the uppermost position on the tower while connecting the second object to the first object to form a connected first object and second object;
   l. coupling the first block to the second block;
   m. gripping the connected first object and second object using the traveling clamp; and
   n. releasing the connected first object and second object from the connecting station, wherein the connected first object and second object are held using the traveling clamp and the traveling block in the uppermost position on the tower.

13. The method of claim 12, wherein the traveling clamp is released from the second object after the second object has been gripped by the gripping means of the connecting station.

* * * * *